(12) United States Patent
Kobayashi et al.

(10) Patent No.: US 7,069,133 B2
(45) Date of Patent: Jun. 27, 2006

(54) WHEEL SPEED CALCULATION METHOD

(75) Inventors: Masashi Kobayashi, Nagano (JP); Manabu Hiroya, Nagano (JP)

(73) Assignee: Nissin Kogyo Co., Ltd., Ueda (JP)

( * ) Notice: Subject to any disclaimer, the term of this patent is extended or adjusted under 35 U.S.C. 154(b) by 89 days.

(21) Appl. No.: 10/728,786

(22) Filed: Dec. 8, 2003

(65) Prior Publication Data

US 2004/0113624 A1 Jun. 17, 2004

(30) Foreign Application Priority Data

Dec. 9, 2002 (JP) .................................. P. 2002-356284
Nov. 19, 2003 (JP) .................................. P. 2003-389730

(51) Int. Cl.
*G01P 3/489* (2006.01)
*G05D 13/62* (2006.01)

(52) U.S. Cl. ............................ 701/70; 701/74; 701/79; 303/168; 324/160

(58) Field of Classification Search .................... 701/70, 701/74, 75, 79, 93, 97; 303/138, 166, 168, 303/171, 173; 180/197; 324/160, 166, 167
See application file for complete search history.

(56) References Cited

U.S. PATENT DOCUMENTS

| | | | |
|---|---|---|---|
| 4,799,178 A | | 1/1989 | Spadafora et al. |
| 4,832,415 A | * | 5/1989 | Shinomiya .................. 303/158 |
| 4,992,730 A | | 2/1991 | Hagiya |
| 5,012,417 A | * | 4/1991 | Watanabe et al. ............. 701/71 |
| 5,621,711 A | * | 4/1997 | Sohmuta .................. 369/53.29 |
| 6,166,534 A | | 12/2000 | Suzumura |

FOREIGN PATENT DOCUMENTS

EP  0 403 055 A2   12/1990
JP    2-44258       2/1990

OTHER PUBLICATIONS

European Search Report dated May 4, 2004.

* cited by examiner

*Primary Examiner*—Tan Q. Nguyen
(74) *Attorney, Agent, or Firm*—Greenblum & Bernstein P.L.C.

(57) ABSTRACT

A wheel speed calculation method wherein, when both rising and falling edges occur, the wheel speed is calculated using both the edges, when either of the edges does not occur, the wheel speed is calculated using both the edges in such a manner that for the edge not occurring, the preceding calculation value or the calculation value provided by assuming that one occurred within the temporary time, whichever is the lower, is selected. Further, neither of the rising and falling edges occurs, the minimum value of the two calculation values provided by assuming that only one edge occurred within the temporary time and the calculation value provided by assuming that only one rising edge and only one falling edge occurred within the temporary time or the calculation value of the preceding wheel speed, whichever is the lower, is selected as the wheel speed.

15 Claims, 3 Drawing Sheets

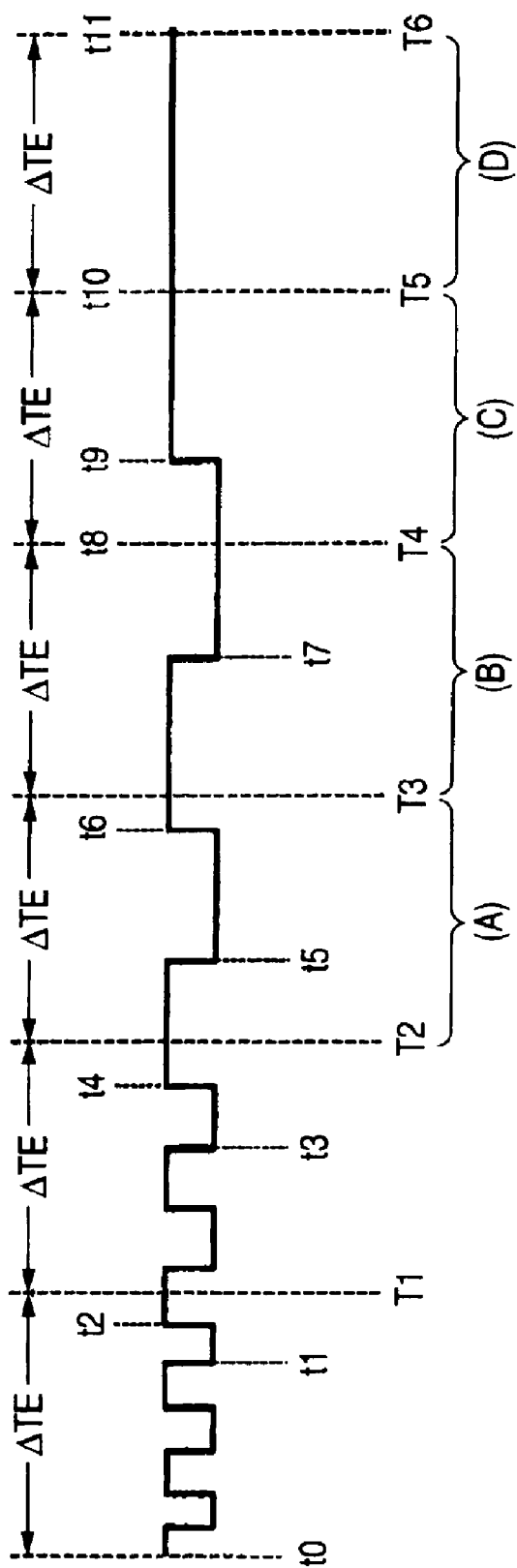

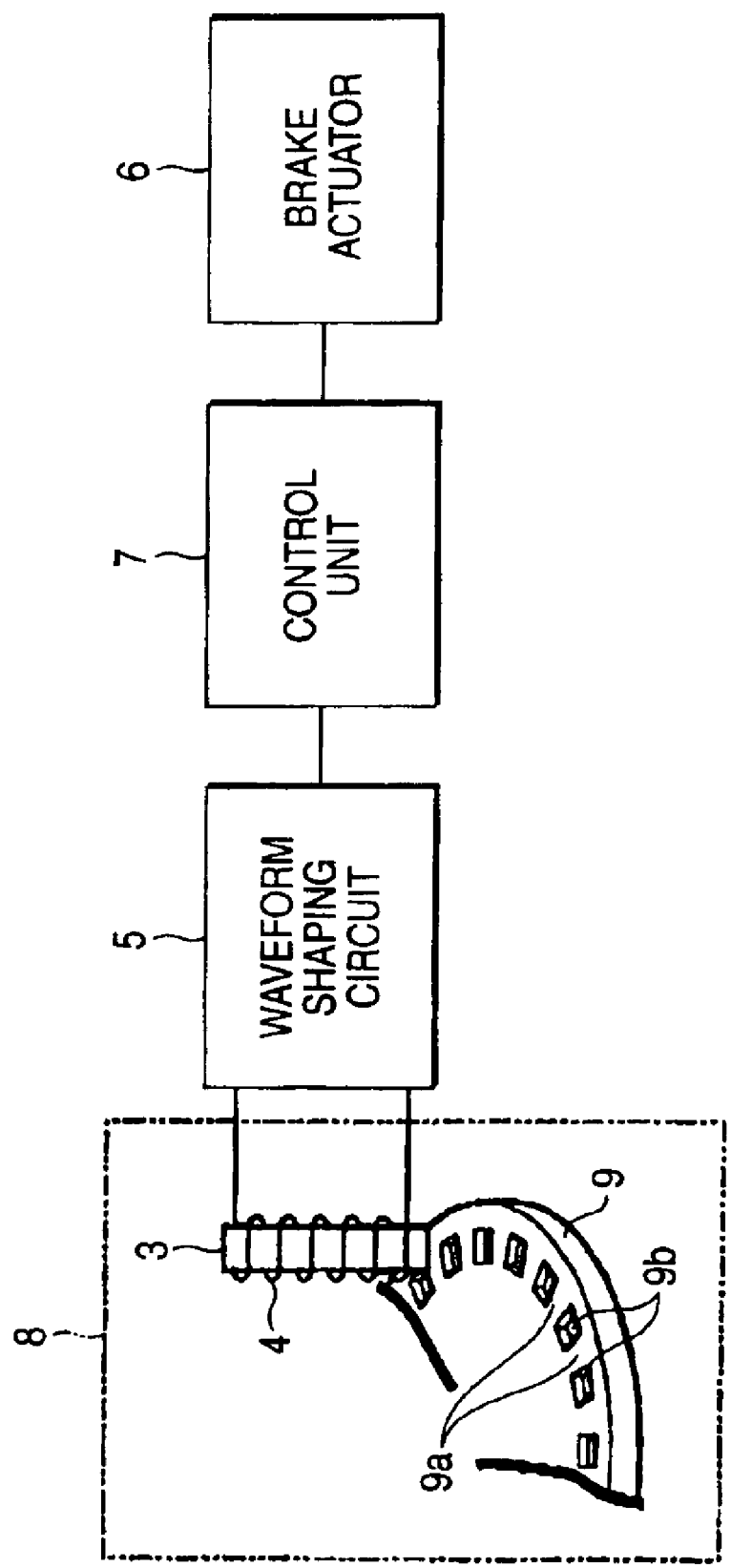

WHEEL SPEED CALCULATION METHOD

BACKGROUND OF THE INVENTION

1. Field of the Invention

The present invention relates to an improvement in a wheel speed calculation method for brake control designed for calculating the wheel speed used for brake control at the calculation timing of a given period based on a pulse signal provided by shaping the waveform of a detection signal of a wheel speed sensor.

2. Description of the Related Art

The following art is already known, for example, in JP-A-2-44258, etc.: To obtain the wheel speed used for antilock brake control and traction control of a brake, switching can be performed between the state in which the wheel speed is calculated using both the rising and falling edges and the state in with the wheel speed is calculated using either the rising or falling edge depending on the greater-than or less-than relationship between the number of the rising edges and that of the falling edges of a pulse signal occurring at the calculation timing of a given period within the calculation period.

By the way, in the related art, the purpose of calculating the wheel speed using either the rising or falling edge is to avoid an increase in the load on software for performing calculation processing of the wheel speed. However, to calculate the wheel speed based on either the rising or falling edge, if an error occurs in a wheel speed sensor, a comparatively large error occurs in the calculation processing result of the wheel speed, resulting in degradation of the brake control accuracy

SUMMARY OF THE INVENTION

It is therefore an object of the invention to provide a wheel speed calculation method for brake control, if an error occurs in a wheel speed sensor, the method for making it possible to absorb the error as much as possible and calculate the wheel speed, with good accuracy, contributing to improvement in the brake control accuracy.

To the end, according to a first aspect of the invention, there is provided a wheel speed calculation method wherein, to calculate wheel speed at the calculation timing of a given period based on a pulse signal provided by shaping the waveform of a detection signal of a wheel speed sensor, the wheel speed sensor including a rotor with a plurality of detected elements rotating with wheel which is a controlled object, when both rising and falling edges occur in the present calculation period, wheel speed VW is calculated as follows:

$$VW=[K \times \{Nu(n)+Nd(n)\}]/\{\Delta Tu(n)+\Delta Td(n)\}$$

when a rising edge does not occur although a falling edge occurs in the present calculation period, the value of VW1 or VW2, whichever is the lower, is selected as the wheel speed VW, VW1 and VW2 being calculated as follows:

$$VW1=[K \times \{Nu(n-1)+Nd(n)\}]/\{\Delta Tu(n-1)+\Delta Td(n)\}$$

$$VW2=[K \times \{1+Nd(n)\}]/\{\Delta Tut+\Delta Td(n)\}$$

when a falling edge does not occur although a rising edge occurs in the present calculation period, the value of VW3 or VW4, whichever is the lower, is selected as the wheel speed VW, VW3 and VW4 being calculated as follows:

$$VW3=[K \times \{Nu(n)+Nd(n-1)\}]/\{\Delta Tu(n)+\Delta Td(n-1)\}$$

$$VW4=[K \times \{Nu(n)+1\}]/\{\Delta Tu(n)+\Delta Tdt\}$$

when neither a rising edge nor a falling edge occurs in the present calculation period, a comparison is made between the minimum value of VW5 to VW7 and the preceding wheel speed VW and the minimum value or the preceding wheel speed VW, whichever is the lower, is selected as the present wheel speed VW, VW5 to VW7 being calculated as follows:

$$VW5=[K \times \{1+Nd(n-1)\})]/\{\Delta Tut+\Delta Td(n-1)\}$$

$$VW6=[K \times \{Nu(n-1)+1\}]/\{\Delta Tu(n-1)+\Delta Tdt\}$$

$$VW7=(K \times 2)/(\Delta Tut+\Delta Tdt)$$

wherein $\Delta Tu(n)$ is the rising side speed calculation reference time between the instant at which the last rising edge of the pulse signal in the preceding calculation period occurs and the instant at which the last rising edge in the present calculation period occurs, $\Delta Td(n)$ is the falling side speed calculation reference time between the instant at which the last falling edge of the pulse signal in the preceding calculation period occurs and the instant at which the last falling edge in the present calculation period occurs, $Nu(n)$ is the number of occurrences of the rising edge within the rising side speed calculation reference time $\Delta Tu(n)$, $Nd(n)$ is the number of occurrences of the falling edge within the falling side speed calculation reference time $\Delta Td(n)$, $\Delta Tut$ is the rising side speed calculation temporary reference time between the instant at which the last rising edge occurs and the present calculation timing when no rising edge occurs in the present calculation period, $\Delta Tdt$ is the falling side speed calculation temporary reference time between the instant at which the last falling edge occurs and the present calculation timing when no falling edge occurs in the present calculation period, K is a constant determined in response to the tire to which calculation of the wheel speed is applied and the number of detected elements of a rotor of the wheel speed sensor, and $\Delta Tu(n-1)$, $\Delta Td(n-1)$, $Nu(n-1)$, and $Nd(n-1)$ are the value of the rising side speed calculation reference time $\Delta Tu(n)$, the value of the falling side speed calculation reference time $\Delta Td(n)$, the value of the number of occurrences $Nu(n)$, and the value of the number of occurrences $Nd(n)$ in the preceding calculation period respectively.

According to a second aspect of the invention, there is provided a wheel speed calculation method as set forth in the first aspect calculates wheel speed used for brake control.

According to a third aspect of the invention, there is provided a wheel speed calculation method as set forth in the second aspect, the wheel speed VW is calculated in a control unit for the brake.

According to the calculation method, when both the rising and falling edges occur in the present calculation period, the control unit calculates the wheel speed VW using the rising speed calculation reference time $\Delta Tu(n)$ between the instant at which the last rising edge of the pulse signal in the preceding calculation period occurs and the instant at which the last rising edge in the present calculation period occurs, the falling speed calculation reference time $\Delta Td(n)$ between the instant at which the last falling edge of the pulse signal in the preceding calculation period occurs and the instant at which the last falling edge in the present calculation period occurs, the number of occurrences of the rising edge $Nu(n)$, and the number of occurrences of the falling edge $Nd(n)$. Thus, if an error occurs in the wheel speed sensor, the method makes it possible to absorb the error as much as possible and calculate the wheel speed with good accuracy and thus contribute to improvement in the brake control accuracy as compared with that for calculating the wheel speed based only on the rising or falling edge. When the rising edge does not occur although the falling edge occurs in the present calculation period or when the falling edge does not occur although the rising edge occurs in the present calculation period, whichever is the lower, is selected as the wheel speed VW. VW1, VW3 is calculated determining that the speed calculation reference time and the number of occurrences of the falling or rising edge not occurring in the present calculation period are the speed calculation reference time $\Delta Tu(n-1)$, $\Delta Td(n-1)$ and the number of occurrences $Nu(n-1)$, $Nd(n-1)$ in the preceding calculation period. VW2, VW4 is calculated using the speed calculation temporary reference time $\Delta Tut$, $\Delta Tdt$ between the instant at which the edge not occurring in the present calculation period occurs last and the present calculation timing and the number of occurrences "1." Thus, the wheel speed is calculated on the safety side for the brake control while calculation is performed considering the error of the wheel speed sensor. If an error occurs in the wheel speed sensor, the method makes it possible to absorb the error as much as possible and calculate the wheel speed with good accuracy and thus contribute to improvement in the brake control accuracy as compared with that for calculating the wheel speed based only on the rising or falling edge. Further, when neither the rising edge nor the falling edge occurs in the present calculation period as the wheel speed becomes extremely low, a comparison is made between the minimum value of VW5, VW6 calculated using the speed calculation temporary reference time $\Delta Tut$, $\Delta Tdt$ and the number of occurrences "1" for one of the rising and falling edges and the speed calculation reference time $\Delta Tu(n-1)$, $\Delta Td(n-1)$ and the number of occurrences $Nu(n-1)$, $Nd(n-1)$ in the preceding calculation period for the other edge, and VW7 calculated using the speed calculation temporary reference time $\Delta Tut$ and $\Delta Tdt$ and the number of occurrences "1" for both the rising and falling edges and the preceding wheel speed, and the minimum value or the preceding wheel speed, whichever is the lower, is selected as the present wheel speed VW. That is, the wheel speed is calculated on the safety side for the brake control while the time passage of the wheel speed as well as the error of the wheel speed sensor is considered. It an error occurs in the wheel speed sensor, the method makes it possible to absorb the error as much as possible and calculate the wheel speed with good accuracy and thus contribute to improvement in the brake control accuracy as compared with that for calculating the wheel speed based only on the rising or falling edge.

BRIEF DESCRIPTION OF THE DRAWINGS

FIG. 2 is a timing chart to show an example of a pulse signal; and

FIG. 3 is a block diagram to show the configuration of a vehicle brake control apparatus of a second embodiment.

DETAILED DESCRIPTION OF THE PREFERRED EMBODIMENTS

Figure 1:
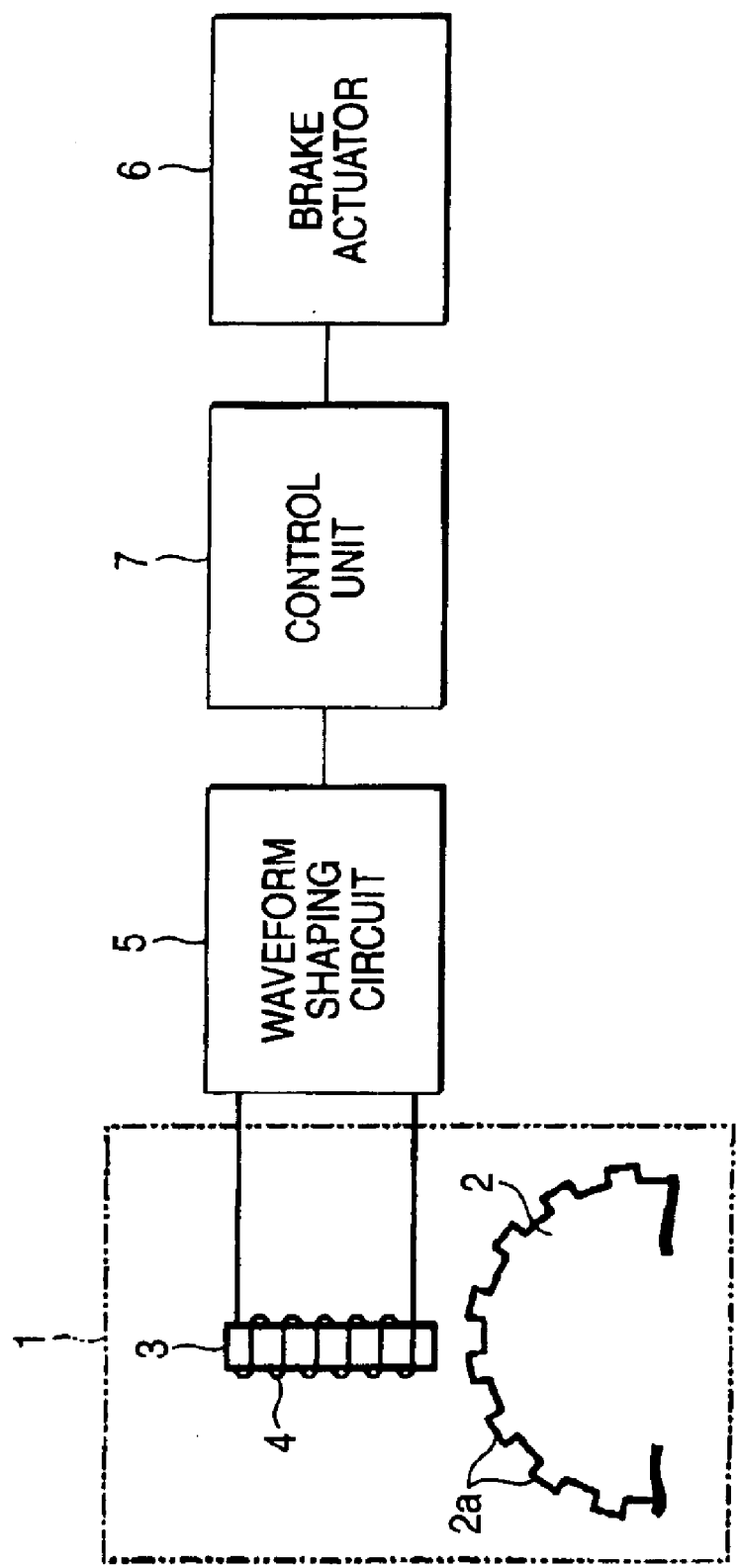
FIG. 1 is a block diagram to show the configuration of a vehicle brake control apparatus of a first embodiment.

Referring now to the accompanying drawings, there is shown a preferred embodiment of the invention.

FIGS. 1 and 2 show a first embodiment of the invention; FIG. 1 is a block diagram to show the configuration of a vehicle brake control apparatus and FIG. 2 is a timing chart to show an example of a pulse signal.

First, in FIG. 1, a wheel speed sensor 1 is a passive sensor including a rotor having a plurality of protrusions 2a . . . on the outer periphery for rotating together with a wheel to be controlled and a pickup coil 4 wound around a permanent magnet 3. An AC voltage occurring on the pickup coil 4 in response to rotation of the rotor 2 is input to a waveform shaping circuit 5, whereby the AC voltage is converted into a pulse signal. On the other hand, to perform antilock brake control and traction control, a brake actuator 6 is controlled by a control unit 7. The pulse signal is input from the waveform shaping circuit 5 to the control unit 7.

The control unit 7 calculates the wheel speed used for brake control at the calculation timing of a given period based on the pulse signal and controls the brake actuator 6 in response to the calculated wheel speed. To calculate the wheel speed, the control unit 7 calculates wheel speed VW using both the rising and falling edges of the pulse signal.

By the way, when the pulse signal input from the waveform shaping circuit 5 to the control unit 7 is the signal shown in FIG. 2, the control unit 7 calculates the wheel speed VW at the calculation timing of given period $\Delta TE$, for example, 10 msec. The pulse signal may be applied to (A) the case where both the rising and falling edges occur in the given period $\Delta TE$; (B) the case where the rising edge does not occur although the falling edge occurs in the given period $\Delta TE$; (C) the case where the falling edge does not occur although the rising edge occurs in the given period $\Delta TE$; (D) the case where neither the rising nor the falling edge occurs in the given period $\Delta TE$. The control unit 7 calculates the wheel speed VW according to the calculation method responsive to (A) to (D).

First, when both the rising and falling edges occur in the present period, the control unit 7 calculates the wheel speed VW according to the following expression (1):

$$VW=[K\times\{Nu(n)+Nd(n)\}]/\{\Delta Tu(n)+\Delta Td(n)\} \quad (1)$$

wherein $\Delta Tu(n)$ is the rising side speed calculation reference time between the instant at which the last rising edge of the pulse signal in the preceding calculation period occurs and the instant at which the last rising edge in the present calculation period occurs, $\Delta Td(n)$ is the falling side speed calculation reference time between the instant at which the last falling edge of the pulse signal in the preceding calculation period occurs and the instant at which the last falling edge in the present calculation period occurs, $Nu(n)$ is the number of occurrences of the rising edge within the rising side speed calculation reference time $\Delta Tu(n)$, $Nd(n)$ is the number of occurrences of the falling edge within the falling side speed calculation reference time $\Delta Td(n)$, and K is a constant determined in response to the tire to which calculation of the wheel speed is applied and the number of the protrusions 2a of the rotor 2 of the wheel speed sensor 1.

When the rising edge does not occur although the falling edge occurs in the present calculation period, the control unit 7 performs calculations according to the following expressions (2) and (3):

$$VW1=[K\times\{Nu(n-1)+Nd(n)\}]/\{\Delta Tu(n-1)+\Delta Td(n)\} \quad (2)$$

$$VW2=[K\times\{1+Nd(n)\}]/\{\Delta Tut+\Delta Td(n)\} \quad (3)$$

wherein $\Delta Tut$ is the rising side speed calculation temporary reference time between the instant at which the last rising edge occurs and the present control timing and $\Delta Tu(n-1)$ and $Nu(n-1)$ are the value of the rising side speed calculation reference time $\Delta Tu(n)$ and the value of the number of occurrences $Nu(n)$ in the preceding calculation period.

The control unit 7 selects VW1 or VW2, whichever is the lower, as the wheel speed VW.

When the falling edge does not occur although the rising edge occurs in the present calculation period, the control unit 7 performs calculations according to the following expressions (4) and (5);

$$VW3=[K\times\{Nu(n)+Nd(n-1)\}]/\{\Delta Tu(n)+\Delta Td(n-1)\} \quad (4)$$

$$VW4=[K\times\{Nu(n)+1\}]/\{\Delta Tu(n)+\Delta Tdt\} \quad (5)$$

wherein $\Delta Tdt$ is the falling side speed calculation temporary reference time between the instant at which the last falling edge occurs and the present control timing and $\Delta Td(n-1)$ and $Nd(n-1)$ are the value of the falling side speed calculation reference time $\Delta Td(n)$ and the value of the number of occurrences $Nd(n)$ in the preceding calculation period. The control unit 7 selects VW3 or VW4, whichever is the lower, as the wheel speed VW.

Further, when neither the rising edge nor the falling edge occurs in the present calculation period, the control unit 7 performs calculations according to the following expressions (6) to (8):

$$VW5=[K\times\{1+Nd(n-1)\}]/\{\Delta Tut+\Delta Td(n-1)\} \quad (6)$$

$$VW6=[K\times\{Nu(n-1)+1\}]/\{\Delta Tu(n-1)+\Delta Tdt\} \quad (7)$$

$$VW7=(K\times 2)/(\Delta Tut+\Delta Tdt) \quad (8).$$

The control unit 7 makes a comparison between the minimum value of VW5 to VW7 and the preceding wheel speed VW and selects the minimum value or the preceding wheel speed VW, whichever is the lower, as the present wheel speed VW.

By the way, in FIG. 2, calculation of the wheel speed VW at calculation timings T1 to T6 after calculation processing is started at time t0 will be discussed with t1 to t11 given to the necessary times of the occurrence times of the rising and falling edges. At the calculation timing T1, the control unit 7 calculates the wheel speed VW using calculation expression (1) applied when both the rising and falling edges occur. $Nu(n)=3$, $Nd(n)=3$, $\Delta Tu(n)=(t2-t0)$, and $\Delta Td(n)=(t1-t0)$ and thus $VW=\{K\times(3+3)\}/\{(t2-t0)+(t1-t0)\}$.

At the calculation timing T2, the control unit 7 calculates the wheel speed VW using calculation expression (1) applied when both the rising and falling edges occur. $Nu(n)=2$, $Nd(n)=2$, $\Delta Tu(n)=(t4-t2)$, and $\Delta Td(n)=(t3-t1)$ and thus $VW=\{K\times(2+2)\}/\{(t4-t2)+(t3-t1)\}$.

At the calculation timing T3, the control unit 7 calculates the wheel speed VW using calculation expression (1) applied when both the rising and falling edges occur. $Nu(n)=1$, $Nd(n)=1$, $\Delta Tu(n)=(t6-t4)$, and $\Delta Td(n)=(t5-t3)$ and thus $VW=\{K\times(1+1)\}/\{(t6-t4)+(t5-t3)\}$.

At the calculation timing T4 of the time t8, the control unit 7 calculates VW1 and VW2 using calculation expressions (2) and (3) applied when the rising edge does not occur although the falling edge occurs. $Nu(n-1)=1$, $Nd(n)=1$, $\Delta Tu(n-1)=(t6-t4)$, $\Delta Td(n)=(t7-t5)$, and $\Delta Tut=(t8-t6)$. Thus, $VW1=\{K\times(1+1)\}/\{(t6-t4)+(t7-t5)\}$ and $VW2=\{K\times(1+1)\}/\{(t8-t6)+(t7-t5)\}$. The control unit 7 selects VW1 or VW2, whichever is the lower, as the wheel speed VW.

At the calculation timing T5 of the time t10, the control unit 7 calculates VW3 and VW4 using calculation expressions (4) and (5) applied when the falling edge does not occur although the rising edge occurs. $Nu(n)=1$, $Nd(n-1)=1$, $\Delta Tu(n)=(t9-t6)$, $\Delta Td(n-1)=(t7-t5)$, and $\Delta Tdt=(t10-t7)$. Thus, $VW3=\{K\times(1+1)\}/\{(t9-t6)+(t7-t5)\}$ and $VW4=\{K\times(1+1)\}/\{(t9-t6)+(t10-t7)\}$. The control unit 7 selects VW3 or VW4, whichever is the lower, as the wheel speed VW.

Further, at the calculation timing T6 of the time t11, the control unit 7 calculates VW5 to VW7 using calculation expressions (6) to (8) applied when neither the rising edge nor the falling edge occurs. $Nd(n-1)=1$, $Nu(n-1)=1$, $\Delta Tu(n-1)=(t9-t6)$, $\Delta Td(n-1)=(t7-t5)$, $\Delta Tut=(t11-t9)$, and $\Delta Tdt=(t11-t7)$. Thus, $VW5=\{K\times(1+1)\}/\{(t11-t9)+(t7-t5)\}$, $VW6=\{K\times(1+1)\}/\{(t9-t6)+(t11-t7)\}$, and $VW7=(K\times2)/\{\Delta(t11-t9)+(t11-t7)\}$. Therefore, the control unit 7 makes a comparison between the minimum value of VW5 to VW7 and the wheel speed provided at the preceding calculation timing and selects the minimum value or the wheel speed, whichever is the lower, as the present wheel speed VW at the calculation timing T6.

Next, the operation of the embodiment is as follows: The control unit 7 calculates the wheel speed VW used for controlling the brake actuator 6 based on the pulse signal provided by shaping the waveform of the detection signal of the wheel speed sensor 1 by the waveform shaping circuit 5. To calculate the wheel speed, the control unit 7 uses both the rising and falling edges of the pulse signal when both the rising and falling edges occur in the present calculation period, the control unit 7 calculates the wheel speed VW according to expression (1) mentioned above.

That is, if both the rising and falling edges occur in the present calculation period, the control unit 7 calculates the wheel speed VW using the rising side speed calculation reference time $\Delta Tu(n)$ between the instant at which the last rising edge of the pulse signal in the preceding calculation period occurs and the instant at which the last rising edge in the present calculation period occurs, the falling side speed calculation reference time $\Delta Td(n)$ between the instant at which the last falling edge of the pulse signal in the preceding calculation period occurs and the instant at which the last falling edge in the present calculation period occurs, the number of occurrences of the rising edge $Nu(n)$, and the number of occurrences of the falling edge $Nd(n)$ If an error occurs in the wheel speed sensor 1, the control unit can absorb the error as much as possible and calculate the wheel speed VW with good accuracy and thus can contribute to improvement in the brake control accuracy as compared with the apparatus for calculating the wheel speed based only on the rising or falling edge.

When the rising edge does not occur although the falling edge occurs in the present calculation period, the control unit 7 selects VW1 or VW2 calculated according to expressions (2) and (3) mentioned above, whichever is the lower, as the wheel speed VW. That is, VW1 is the wheel speed calculated using the falling side speed calculation reference time $\Delta Td(n)$ and the number of occurrences of the falling edge $Nd(n)$ in the present calculation period and the rising side speed calculation reference time $\Delta Tu(n-1)$ and the number of occurrences of the rising edge $Nu(n-1)$ in the preceding calculation period. VW2 is the wheel speed calculated using the falling side speed calculation reference time $\Delta Td(n)$ and the number of occurrences of the falling edge $Nd(n)$ in the present calculation period and the rising side speed calculation temporary reference time $\Delta Tut$ between the instant at which the last rising edge occurs and the present calculation timing and the number of occurrences "1" VW1 or VW2, whichever is the lower, is selected as the wheel speed VW.

When the falling edge does not occur although the rising edge occurs in the present calculation period, the control unit 7 selects VW3 or VW4 calculated according to expressions (4) and (5) mentioned above, whichever is the lower, as the wheel speed VW. That is, VW3 is the wheel speed calculated using the rising side speed calculation reference time $\Delta Tu(n)$ and the number of occurrences of the rising edge $Nu(n)$ in the present calculation period and the falling side speed calculation reference time ΔTd(n−1) and the number of occurrences of the falling edge Nd(n−1) in the preceding calculation period. VW4 is the wheel speed calculated using the rising side speed calculation reference time ΔTu(n) and the number of occurrences of the rising edge Nu(n) in the present calculation period and the failing side speed calculation temporary reference time ΔTdt between the instant at which the last falling edge occurs and the present calculation timing and the number of occurrences "1" VW3 or VW4, whichever is the lower, is selected as the wheel speed VW.

Thus, when the rising edge does not occur although the falling edge occurs in the present calculation period or when the falling edge does not occur although the rising edge occurs in the present calculation period, the wheel speed VW is calculated on the safety side for the brake control while calculation is performed considering the error of the wheel speed sensor 1. If an error occurs in the wheel speed sensor 1, the control unit can absorb the error as much as possible and calculate the wheel speed VW with good accuracy and thus can contribute to improvement in the brake control accuracy as compared with the apparatus for calculating the wheel speed based only on the rising or falling edge.

Further, when neither the rising edge nor the falling edge occurs in the present calculation period, the control unit 7 makes a comparison between the minimum value of VW5 calculated using the rising side speed calculation temporary reference time ΔTut and the number of occurrences "1" for the rising edge and the falling side speed calculation reference time ΔTd (n−1) and the number of occurrences of the falling edge Nd(n−1) in the preceding calculation period for the falling edge, VW6 calculated using the falling side speed calculation temporary reference time ΔTdt and the number of occurrences "1" for the falling edge and the rising side speed calculation reference time ΔTu(n−1) and the number of occurrences of the rising edge Nu(n−1) in the preceding calculation period for the rising edge, and VW7 calculated using the rising side speed calculation temporary reference time ΔTut and the falling side speed calculation temporary reference time ΔTdt and the number of occurrences "1" for the rising and falling edges and the preceding wheel speed, and selects the minimum value or the preceding wheel speed, whichever is the lower, as the present wheel speed VW. Thus, the wheel speed VW is calculated on the safety side for the brake control while the time passage of the wheel speed VW as well as the error of the wheel speed sensor 1 is considered. If an error occurs in the wheel speed sensor 1, the control unit can absorb the error as much as possible and calculate the wheel speed VW with good accuracy and thus can contribute to improvement in the brake control accuracy as compared with the apparatus for calculating the wheel speed VW based only on the rising or falling edge.

FIGS. 1 and 2 show one embodiment of the invention; FIG. 1 is a block diagram to show the configuration of a vehicle brake control apparatus and FIG. 2 is a timing chart to show an example of a pulse signal.

FIG. 3 shows a second embodiment of the invention. A wheel speed sensor 8 is a passive sensor including a rotor 9 having a plurality of detected elements 9a, 9a . . . on one outer periphery surface for rotating together with a wheel to be controlled and a pickup coil 4 wound around a permanent magnet 3. The detected elements 9a, 9a . . . is formed with a plurality of recessed portion 9b, 9b . . . or a plurality of holes disposed on one outer periphery surface at equal space in circumferential direction. An AC voltage occurring on the pickup coil 4 in response to rotation of the rotor 9 is input to a wave form shaping circuit 5, whereby the AC voltage is converted into a pulse signal. To perform antilock brake control and traction control, a brake actuator 6 is controlled by a control unit 7. The pulse signal is input from the waveform shaping circuit 5 to the control unit 7.

The control unit 7 calculates the wheel speed used for brake control at the calculation timing of a given period based on the pulse signal and controls the brake actuator 6 in response to the calculated wheel speed, as well as the first embodiment.

This second embodiment effects the similar advantage as that of the first embodiment.

Although the embodiment of the invention has been described, it is to be understood that the invention is not limited to the embodiment described above and changes and variations may be made without departing from the spirit and the scope of the invention as claimed.

For example, the embodiment has been described with the passive wheel speed sensor 1, but the invention can also be applied to an active wheel speed sensor using a Hall element.

As described above, according to the invention, if an error occurs in the wheel speed sensor, the control unit can absorb the error as much as possible and calculate the wheel speed with good accuracy, contributing to improvement in the brake control accuracy.

What is claimed is:

1. A wheel speed calculation method wherein, to calculate wheel speed at the calculation timing of a given period based on a pulse signal provided by shaping the waveform of a detection signal of a wheel speed sensor (1,8), the wheel speed sensor including a rotor (2,9) with a plurality of detected elements rotating with wheel which is a controlled object, when both rising and falling edges occur in the present calculation period, wheel speed VW is calculated as follows:

$$VW=[K\times\{Nu(n)+Nd(n)\}]/\{\Delta Tu(n)+\Delta Td(n)\}$$

when a rising edge does not occur although a falling edge occurs in the present calculation period, the value of VW1 or VW2, whichever is the lower, is selected as the wheel speed VW, VW1 and VW2 being calculated as follows:

$$VW1=[K\times\{Nu(n-1)+Nd(n)\}]/\{\Delta Tu(n-1)+\Delta Td(n)\}$$

$$VW2=[K\times\{1+Nd(n)\}]/\{\Delta Tut+\Delta Td(n)\}$$

when a falling edge does not occur although a rising edge occurs in the present calculation period, the value of VW3 or VW4, whichever is the lower, is selected as the wheel speed VW, VW3 and VW4 being calculated as follows:

$$VW3=[K\times\{Nu(n)+Nd(n-1)\}]/\{\Delta Tu(n)+Td(n-1)\}$$

$$VW4=[K\times\{Nu(n)+1\}]/\{\Delta Tu(n)+\Delta Tdt\}$$

when neither a rising edge nor a falling edge occurs in the present calculation period, a comparison is made between the minimum value of VW5 to VW7 and the preceding wheel speed VW and the minimum value or the preceding wheel speed VW, whichever is the lower, is selected as the present wheel speed VW, VW5 to VW7 being calculated as follows:

$VW5=[K\times\{1+Nd(n-1)\}]/\{\Delta Tut+\Delta Td(n-1)\}$ $VW6=[K\times\{Nu(n-1)+1\}]/\{\Delta Tu(n-1)+\Delta Tdt\}$ $VW7=(K\times 2)/(\Delta Tut+\Delta Tdt)$ wherein $\Delta Tu(n)$ is the rising side speed calculation reference time between the instant at which the last rising edge of the pulse signal in the preceding calculation period occurs and the instant at which the last rising edge in the present calculation period occurs, $\Delta Td(n)$ is the falling side speed calculation reference time between the instant at which the last falling edge of the pulse signal in the preceding calculation period occurs and the instant at which the last falling edge in the present calculation period occurs, Nu(n) is the number of occurrences of the rising edge within the rising side speed calculation reference time $\Delta Tu(n)$, Nd(n) is the number of occurrences of the falling edge within the falling side speed calculation reference time $\Delta Td(n)$, $\Delta Tut$ is the rising side speed calculation temporary reference time between the instant at which the last rising edge occurs and the present calculation timing when no rising edge occurs in the present calculation period, $\Delta Tdt$ is the falling side speed calculation temporary reference time between the instant at which the last falling edge occurs and the present calculation timing when no falling edge occurs in the present calculation period, K is a constant determined in response to a tire to which calculation of the wheel speed is applied and the number of detected elements (2a, 9a) of a rotor (2, 9) of the wheel speed sensor (1, 8), and $\Delta Tu(n-1)$, $\Delta Td(n-1)$, Nu(n-1), and Nd(n-1) are the value of the rising side speed calculation reference time $\Delta Tu(n)$, the value of the falling side speed calculation reference time $\Delta Td(n)$, the value of the number of occurrences Nu(n), and the value of the number of occurrences Nd(n) in the preceding calculation period respectively.

2. A wheel speed calculation method as set forth in claim 1 calculates the wheel speed used for brake control.

3. A wheel speed calculation method asset forth in claim 2, the wheel speed VW is calculated in a control unit for the brake.

4. A wheel speed calculation method wherein, to calculate wheel speed at the calcualtion timing of a given period based on a pulse signal provided by shaping the waveform of a detection signal of a wheel speed sensor, the wheel speed sensor including a rotor with a plurality of detected elements rotating with wheel which is a controlled object; the method comprising: calculating wheel speed VW with expressions, wherein different expressions are applied respectively when both rising and falling edges of the pulse signal occur in the present calculation period.

when the rising edge does not occur although the falling edge occurs in the present calculation period, when the falling edge does not occur although the rising edge occurs in the present calculation period, when neither the rising edge nor the falling edge occurs in the present calculation period.

5. A wheel speed calculation method as claimed in claim 4, wherein, when both rising and falling edges occur in the present calculation period, wheel speed VW is calculated as follows:

$VW=[K\times\{Nu(n)+Nd(n)\}]/\{\Delta Tu(n)+\Delta Td(n)\}$ when a rising edge does not occur although a falling edge occurs in the present calculation period, the value of VW1 or VW2, whichever is the lower, is selected as the wheel speed VW, VW1 and VW2 being calculated as follows:

$VW1=[K\times\{Nu(n-1)+Nd(n)\}]/\{\Delta Tu(n-1)+\Delta Td(n)\}$ $VW2=[K\times\{1+Nd(n)\}]/\{\Delta Tut+\Delta Td(n)\}$ when a falling edge does not occur although a rising edge occurs in the present calculation period, the value of VW3 or VW4, which is the lower, is selected as the wheel speed VW, VW3 and VW4 being calculated as follows:

$VW3=[K\times\{Nu(n)+Nd(n-1)\}]/\{\Delta Tu(n)+Td(n-1)\}$ $VW4=[K\times\{Nu(n)+1\}]/\{\Delta Tu(n)+\Delta Tdt\}$ when neither a rising edge nor a falling edge occurs in the present calculation period, a comparsion is made between the minimum value of VW5 to VW7 and the preceding wheel speed VW and the minimum value or the preceding wheel speed VW, whichever is the lower, is selected as the present wheel speed VW, VW5 to VW7 being calculated as follows:

$VW5=[K\times\{1+Nd(n-1)\}]/\{\Delta Tut+\Delta Td(n-1)\}$ $VW6=[K\times\{Nu(n-1)+1\}]/\{\Delta Tu(n-1)+\Delta Tdt\}$ $VW7=(K\times 2)/(\Delta Tut+\Delta Tdt)$ wherein $\Delta Tu(n)$ is the rising side speed calculation reference time between the instant at which the last rising edge of the pulse signal in the preceding calculation period occurs and the instant at which the last rising edge in the present calculation period occurs, $\Delta Td(n)$ is the falling side speed calculation reference time between the instant at which the last falling edge of the pulse signal in the preceding calculation period occurs and the instant at which the last falling edge in the present calculation period occurs, Nu(n) is the number of occurrences of the rising edge within the rising side speed calculation reference time $\Delta Tu(n)$, Nd(n) is the number of occurrences of the falling edge within the falling side speed calculation reference time $\Delta Td(n)$, $\Delta Tut$ is the rising side speed calculation temporary reference time between the instant at which the last rising edge occurs and the present calculation timing when no rising edge occurs in the present calculation period, $\Delta Tdt$ is the falling side speed calculation temporary reference time between the instant at which the last falling edge occurs and the present calculation timing when no falling edge occurs in the present calculation period, K is a constant determined in response to a tire to which calculation of the wheel speed is applied and the number of detected elements of a rotor of the wheel speed sensor, and $\Delta Tu(n-1)$, $\Delta Td(n-1)$, $Nu(n-1)$, and $Nd(n-1)$ are the value of the rising side speed calculation reference time $\Delta Tu(n)$, the value of the falling side speed calculation reference time $\Delta Td(n)$, the value of the number of occurrences $Nu(n)$, and the value of the number of occurrences $Nd(n)$ in the preceding calculation period respectively.

6. A wheel speed calculation method as set forth in claim 5, which calculates the wheel speed used for brake control.

7. A wheel speed calculation method as set forth in claim 6, in which the wheel speed VW is calculated in a control unit for the brake.

8. A wheel speed calculation apparatus comprising:

a control unit that receives a pulse signal provided by shaping a waveform of a detection signal of a wheel speed sensor;

wherein the control unit calculates wheel speed VW with expressions that are respectively different when both rising and falling edges of the pulse signal occur in a present calculation period, when the rising edge does not occur although the falling edge occurs in the present calculation period, when the falling edge does not occur although the rising edge occurs in the present calculation period, and when neither the rising edge nor the falling edge occurs in the present calculation period.

9. A vehicle brake control apparatus, as claimed in claim 8, further comprising:

a wheel speed sensor that outputs a detection signal; and a waveform shaping circuit for shaping a waveform of the detection signal; wherein the control unit calculates a wheel speed at a calculation timing of a given period based on the pulse signal; and the apparatus further comprises a brake actuator controlled by a control unit in response to the calculated wheel speed.

10. A wheel speed calculation method apparatus as claimed in claim 8 wherein, when both rising and falling edges occur in the present calculation period, wheel speed VW is calculated as follows:

$$VW = [K \times \{Nu(n) + Nd(n)\}]/\{\Delta Tu(n) + \Delta Td(n)\}$$

when a rising edge does not occur although a falling edge occurs in the present calculation period, the value of VW1 or VW2, whichever is the lower, is selected as the wheel speed VW, VW1 and VW2 being calculated as follows:

$$VW1 = [K \times \{Nu(n-1) + Nd(n)\}]/\{\Delta Tu(n-1) + \Delta Td(n)\}$$

$$VW2 = [K \times \{1 + Nd(n)\}]/\{\Delta Tut + \Delta Td(n)\}$$

when a falling edge does not occur although a rising edge occurs in the present calculation period, the value of VW3 or VW4, whichever is the lower, is selected as the wheel speed VW, VW3 and VW4 being calculated as follows:

$$VW3 = [K \times \{Nu(n) + Nd(n-1)\}]/\{\Delta Tu(n) + \Delta Td(n-1)\}$$

$$VW4 = [K \times \{Nu(n) + 1\}]/\{\Delta Tu(n) + \Delta Tdt\}$$

when neither a rising edge nor a falling edge occurs in the present calculation period, a comparison is made between the minimum value of VW5 to VW7 and the preceding wheel speed VW and the minimum value or the preceding wheel speed VW, whichever is the lower, is selected as the present wheel speed VW, VW5 to VW7 being calculated as follows:

$$VW5 = [K \times \{1 + Nd(n-1)\}]/\{\Delta Tut + \Delta Td(n-1)\}$$

$$VW6 = [K \times \{Nu(n-1) + \Delta Tdt\}]$$

$$VW7 = (K \times 2)/(\Delta Tut + \Delta Tdt)$$

wherein $\Delta Tu(n)$ is the rising side speed calculation reference time between the instant at which the last rising edge of the pulse signal in the preceding calculation period occurs and the instant at which the last rising edge in the present calculation period occurs, $\Delta Td(n)$ is the falling side speed calculation reference time between the instant at which the last falling edge of the pulse signal in the preceding calculation period occurs and the instant at which the last falling edge in the present calculation period occurs, $Nu(n)$ is the number of occurrences of the rising edge within the rising side speed calculation reference time $\Delta Tu(n)$, $Nd(n)$ is the number of occurrences of the falling edge within the falling side speed calculation reference time $\Delta Td(n)$, $\Delta Tut$ is the rising side speed calculation temporary reference time between the instant at which the last rising edge occurs and the present calculation timing when no rising edge occurs in the present calculation period, $\Delta Tdt$ is the falling side speed calculation temporary reference time between the instant at which the last falling edge occurs and the present calculation timing when no falling edge occurs in the present calculation period, K is a constant determined in response to a tire to which calculation of the wheel speed is applied and the number of detected elements of a rotor of the wheel speed sensor and $\Delta Tu(n-1)$, $\Delta Td(n-1)$, $Nu(n-1)$, and $Nd(n-1)$ are the value of the rising side speed calculation reference time $\Delta Tu(n)$, the value of the falling side speed calculation reference time $\Delta Td(n)$, the value of the number of occurrences $Nu(n)$, and the value of the number of occurrences $Nd(n)$ in the preceding calculation period respectively.

11. A wheel speed calculation method as set forth in claim 10, which calculates the wheel speed used for brake control.

12. A wheel speed calculation method as set forth in claim 11, in which the wheel speed VW is calculated in a control unit for the brake.

13. A wheel speed calculation method apparatus as claimed in claim 6 wherein, when both rising and falling edges occur in the present calculation period, wheel speed VW is calculated as follows:

$$VW = [K \times \{Nu(n) + Nd(n)\}]/\{\Delta Tu(n) + \Delta Td(n)\}$$

when a rising edge does not occur although a falling edge occurs in the present calculation period, the value of VW1 or VW2, whichever is the lower, is selected as the wheel speed VW, VW1 and VW2 being calculated as follows:

$$VW1=[K\times\{Nu(n-1)+Nd(n)\}]/\{\Delta Tu(n-1)+\Delta Td(n)\}$$

$$VW2=[K\times\{1+Nd(n)\}]/\{\Delta Tut+\Delta Td(n)\}$$

when a falling edge does not occur although a rising edge occurs in the present calculation period, the value of VW3 or VW4, whichever is the lower, is selected as the wheel speed VW, VW3 and VW4 being calculated as follows:

$$VW3=[K\times\{Nu(n)+Nd(n-1)\}]/\{\Delta Tu(n)+\Delta Td(n-1)\}$$

$$VW4=[K\times\{Nu(n)+1\}]/\{\Delta Tu(n)+\Delta Tdt\}$$

when neither a rising edge nor a falling edge occurs in the present calculation period, a comparison is made between the minimum value of VW5 to VW7 and the preceding wheel speed VW and the minimum value or the preceding wheel speed VW, whichever is the lower, is selected as the present wheel speed VW, VW5 to VW7 being calculated as follows:

$$VW5=[K\times\{1+Nd(n-1)\}]/\{\Delta Tut+\Delta Td(n-1)\}$$

$$VW6=[K\times\{Nu(n-1)+\Delta Tdt\}$$

$$VW7=(K\times 2)/(\Delta Tut+\Delta Tdt)$$

wherein $\Delta Tu(n)$ is the rising side speed calculation reference time between the instant at which the last rising edge of the pulse signal in the preceding calculation period occurs and the instant at which the last rising edge in the present calculation period occurs, $\Delta Td(n)$ is the falling side speed calculation reference time between the instant at which the last falling edge of the pulse signal in the preceding calculation period occurs and the instant at which the last falling edge in the present calculation period occurs, $Nu(n)$ is the number of occurrences of the rising edge within the rising side speed calculation reference time $\Delta Tu(n)$, $Nd(n)$ is the number of occurrences of the falling edge within the falling side speed calculation reference time $\Delta Td(n)$, $\Delta Tut$ is the rising side speed calculation temporary reference time between the instant at which the last rising edge occurs and the present calculation timing when no rising edge occurs in the present calculation period, $\Delta Tdt$ is the falling side speed calculation temporary reference time between the instant at which the last falling edge occurs and the present calculation timing when no falling edge occurs in the present calculation period, $K$ is a constant determined in response to a tire to which calculation of the wheel speed is applied and the number of detected elements of a rotor of the wheel speed sensor and $\Delta Tu(n-1)$, $\Delta Td(n-1)$, $Nu(n-1)$, and $Nd(n-1)$ are the value of the rising side speed calculation reference time $\Delta Tu(n)$, the value of the falling side speed calculation reference time $\Delta Td(n)$, the value of the number of occurrences $Nu(n)$, and the value of the number of occurrences $Nd(n)$ in the preceding calculation period respectively.

14. A wheel speed calculation method as set forth in claim 13, which calculates the wheel speed used for brake control.

15. A wheel speed calculation method as set forth in claim 14, in which the wheel speed VW is calculated in a control unit for the brake.

\* \* \* \* \*